DIRECTION SIGNALING SYSTEM

Filed July 22, 1948 4 Sheets-Sheet 1

INVENTORS
John W. Lawson and William E. Brown
BY
Spencer, Willits, Helwig & Baillio INVENTORS
John W. Lawson & William E. Brown
BY
Spencer, Willits, Helwig & Baillio INVENTORS
John W. Lawson & William E. Brown
BY
Spencer, Willits, Helmig & Baillio July 8, 1952 J. W. LAWSON ET AL 2,602,849

DIRECTION SIGNALING SYSTEM

Filed July 22, 1948 4 Sheets-Sheet 4

INVENTORS
John W. Lawson & William E. Brown
BY
Spencer, Willits, Helwig & Baillio Patented July 8, 1952

2,602,849

UNITED STATES PATENT OFFICE 2,602,849

DIRECTION SIGNALING SYSTEM

John W. Lawson and William E. Brown, Anderson, Ind., assignors to General Motors Corporation, Detroit, Mich., a corporation of Delaware Application July 22, 1948, Serial No. 40,196

9 Claims. (Cl. 177—337)

This invention relates to systems of direction and stop signalling for automotive use.

An object of the invention is to provide a turn signal switch of simple economical and durable construction by which current is directed to the signal lamps which indicate direction of turn and stopping when brakes are applied. This object is accomplished in the disclosed embodiment of the invention by the provision of two rows of stationary contacts of three contacts each. The center contact of the first row is connected with the current source through a stop switch which is closed when the brakes are applied and the end contacts of the first row are connected respectively with right-rear and left-rear lamps. The center contact of the second row is connected with the source through a flasher and the end contacts of the second row are connected respectively with the right-front and left-front turn-signal lamps. The switch provides three movable contacts which are simultaneously actuated. One of the movable contacts has a center position connecting all contacts of the first row and has positions on either side of center position for connecting the center contact of the first row with one or the other of the end contacts of the first row. Thus the stop light switch will cause both of the rear lamps to burn in case the turn signal switch is in no-turn or neutral status, and will cause one or the other of the rear lamps to burn steadily in case the turn signal switch is manipulated to indicate a turn. When the turn signal switch is manipulated to indicate a right turn, another movable contact connects the stationary center contact of the second row with those end contacts of the two rows which are connected respectively with right front and right rear lamps which burn intermittently.

When the turn signal switch is manipulated to indicate a left turn, another movable contact connects the stationary second contact of the second row with those end contacts of the two rows which are connected respectively with the left-front and left-rear lamps which burn intermittently.

The first mentioned movable contact has five contact bosses. The non-conducting stationary contact support provides recesses around the contacts of the first row so that the nonfunctioning contact bosses of the first mentioned movable contact will not engage a stationary part and will not therefore, interfere with proper engagement with stationary contacts by the functioning contact bosses. The first mentioned movable contact makes either three-point (tripod) or two-point engagement with stationary contacts. Each of the other movable contacts has three contact bosses and can make by virtue of three-point contact the proper electrical connection with three stationary contacts.

Another object is to facilitate the control of pilot lamps which indicate the functioning of the system. For this purpose, each end contact of the second mentioned row of fixed contacts is connected also with a pilot lamp. The two pilot lamps are connected with the current source by a relay switch associated with the flasher. When manipulated to indicate a turn, the turn-signal switch shorts out one of the pilot lamps while the other pilot lamp burns, its circuit being made through that front turn-signal lamp which is not then in circuit with the flasher.

Further objects and advantages of the present invention will be apparent from the following description, reference being had to the accompanying drawings wherein a preferred embodiment of the invention is clearly shown.

Figures 9, 10, 11, 12, 13:
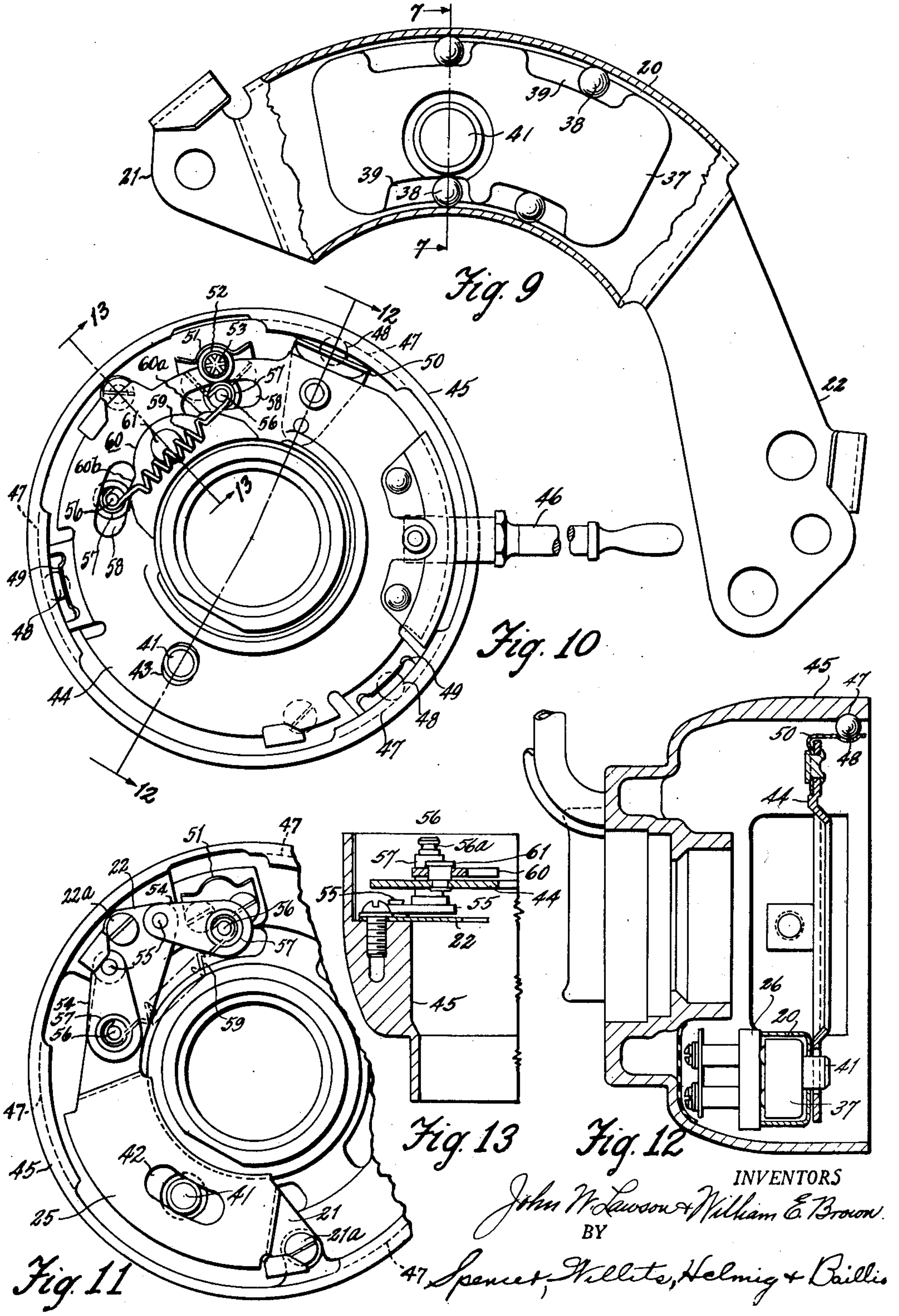
Fig. 9 shows a top plan view of the carrier of the movable contacts of the switch, the case being in section on line 9—9 of Fig. 5.
Fig. 10 is a plan view of a switch housing and switch operating mechanism.
Fig. 11 is a fragmentary view similar to Fig. 10, certain parts being removed in order to show the switch case in position in the housing.

Figs. 12 and 13 are sectional views on lines 12—12 and 13—13 respectively of Fig. 10.

Figure 14:
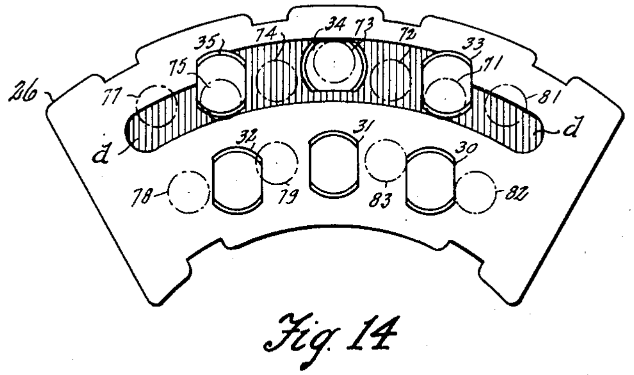
Figure 15:
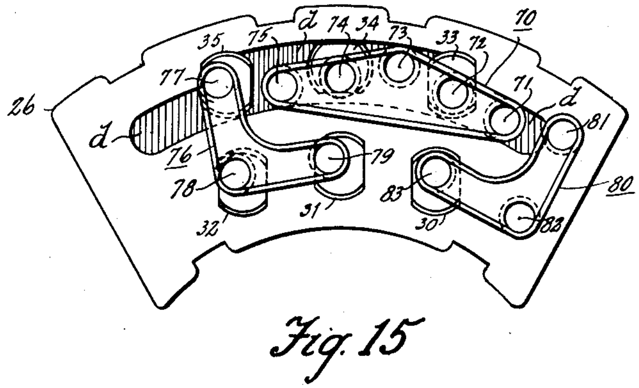
Figure 16:
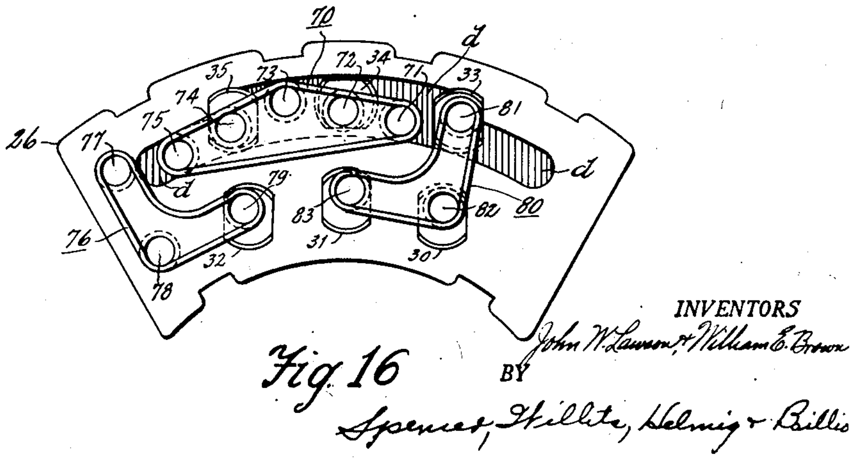

Figs. 14, 15 and 16 are inside views of the switch back plate 26 with the movable contacts shown in different positions in these views.

Figures 4, 5, 6, 7, 8:
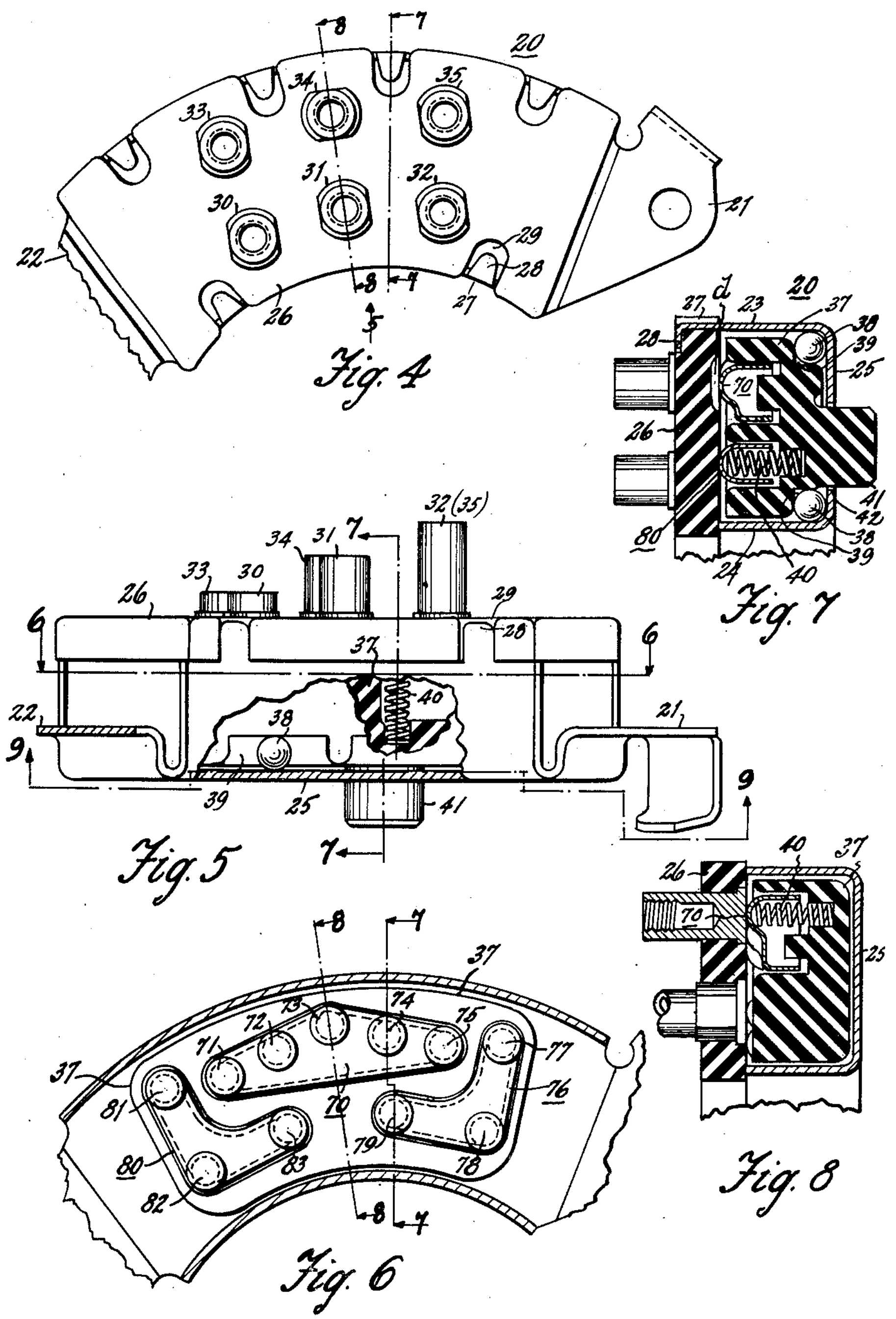
Fig. 4 is a bottom view of a switch included in the system shown in Fig. 1.
Fig. 5 is a view in the direction of arrow 5 of Fig. 4, certain parts being shown in section.
Fig. 6 shows the switch case in section on line 6—6 of Fig. 5 and a bottom plan view of the movable contacts of the switch.
Fig. 7 is a sectional view on line 7—7 of Figs. 4, 5, 6 and 9.
Fig. 8 is a sectional view on line 8—8 of Figs. 4 and 6.

The switch case 20 is shaped like an arcuate channel and is provided with mounting brackets 21 and 22. Its concentric cylindrical side walls 23 and 24 merge with an arcuate, flat wall 25. As shown in Fig. 11, wall 25 is the top wall. The case 20 is closed at the bottom (top in Fig. 4) by a non-conducting back plate 26 having notches 27 for receiving tangs extending from the side walls of the case, said tangs being bent over at 28 into recess 29 provided by the plate. The plate carries members 30, 31, 32, 33, 34 and 35 which serve as terminals and also as stationary contact members, said members being inserts (as shown in Fig. 8) in plate 26 which is made of molded insulating material. Case 20 encloses a movable contact carrier 37 of arcuate shape as shown in Fig. 6 which is movable in an arcuate path between the case walls 23 and 24 and is guided for such movement by a plurality of balls 38 received respectively by recesses 39 of the carrier 37 and bearing against the corner portions of the case 20. Contact springs 40 which urge movable contacts 70, 76 and 80 (Fig. 6) toward the plate 26 maintain the carrier 37 in contact with balls 38 and the latter in contact with the walls of the switch case as shown in Fig. 7.

Carrier 37 provides a cylindrical lug 41 which extends through an arcuate slot 42 of case wall 25 and through a radial slot 43 of a ring plate 44 supported by housing 45 for rotation coaxially thereof. Housing 45 is adapted to be mounted upon the stationary steering column post of an automobile and to be located under the steering wheel so that a handle 46 attached to the plate 44 is readily accessible to the driver. Housing 45 is provided with tracks 47 for receiving balls 48 which are received by tracks provided by clips 49 and 50 attached to the plate 44, clip 49 being relatively rigid and clip 50 relatively resilient. Plate 44 is retained in neutral position shown in Fig. 10 by the cooperation of a detent clip 51 attached to housing 45 with a roller 52 and a stud 53 pivotally attached to plate 44. Switch case bracket 21 is attached by a screw 21*a* to housing 45 and switch case bracket 22 is attached by a screw 22*a*. Bracket 22 provides pivots 55 for arms 54 carrying studs 56 supporting rollers 57 which extend through arcuate slots 58 in plate 44. The ends of the studs 56 extend above the plate 44 and are grooved at 56*a* (Fig. 13), to receive the hooked ends of a spring 59. There is slight clearance between the sides of the slots 58 and the rollers 57. The function of the spring 59 tends to urge the pivots of these rollers toward each other and to bias them toward the ends of a lever 60 pivotally supported by a stud 61. When handle 46 is moved down in Fig. 10 to rotate plate 44 clockwise, the surface 60*a* of lever 60 is brought into contact with the upper roller 57 which biases the lever 60 toward a cam rotating with the steering wheel shaft (not shown). Similarly when handle 46 is moved up and plate 44 is moved counterclockwise, the portion 60*b* of lever 60 is engaged by the lower roller 57, thereby biasing it toward the steering wheel cam.

In advance of making a right turn, the handle 46 is moved down to cause lever 60 to be urged clockwise so that its upper portion will be engaged by a cam rotatable with the steering wheel shaft. Consequently when the steering wheel is turned clockwise to make a right turn, the tendency is to maintain the plate 44 in the position in which it had been moved by the handle 46. After the turn has been partially completed and the driver reverses motion of the steering wheel to straighten out the front wheels of the automobile, this reverse motion of the steering wheel through mechanical connection with the end of lever 60 causes plate 44 to move back to neutral position, thereby interrupting the signal for the right-hand turn. The same thing happens with respect to the left-hand turn. The mechanism for accomplishing this is not per se a part of the present invention.

Referring again to Figs. 4 to 8, the contact carrier 37 supports a movable contact 70 having five contact bosses 71, 72, 73, 74, 75, a contact 76 having bosses 77, 78 and 79 and a contact 80 having bosses 81, 82 and 83. Between the carrier 37 and each of the bosses of the contacts 76 and 80 there is located a spring 40 as shown in Fig. 7. Between the carrier 37 and each of the bosses 71, 73 and 75 there is located a spring 40 as shown in Fig. 8.

Figure 1:
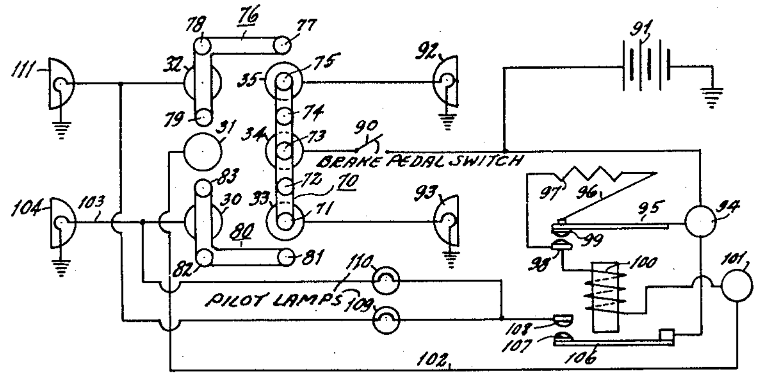
Fig. 1 is a wiring diagram of a directional signal light and stop light system embodying the present invention.

Fig. 1 shows the movable contacts 76 and 80 in neutral position. Contacts 30 and 32 are not connected with the contact 31. Contact 70 connects contacts 33, 34 and 35. When the stop light switch 90 is closed, current flows from the battery 91 to the right rear lamp 92 and the left rear lamp 93 to indicate application of brakes.

Figure 2:
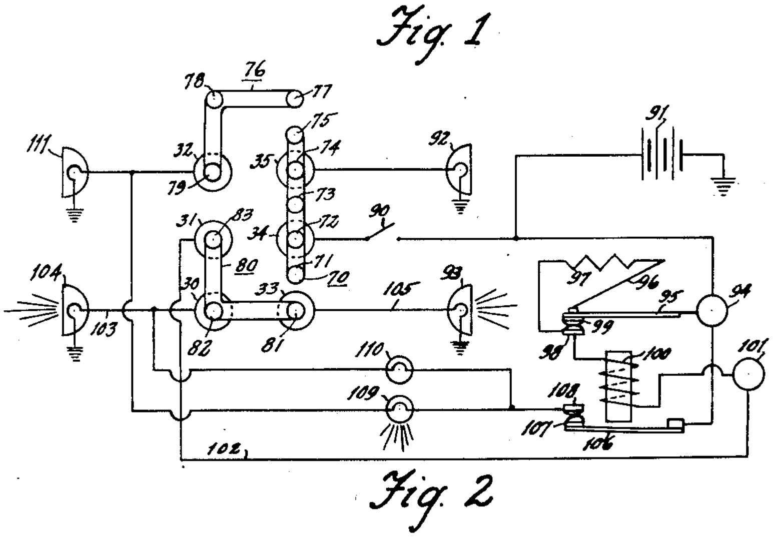
Figs. 2 and 3 show the system under different operating conditions.

When lever 46 (Fig. 10) is moved counterclockwise the contacts 70, 76 and 80 move to the position shown in Fig. 2. Current then flows from battery 91 to flasher terminal 94, hinged blade 95, hot wire 96, resistor 97, contact 98 (normally separated from contact 99 carried by blade 95), magnet coil 100, terminal 101, wire 102, contact 31, contact 80, contact 30, wire 103, lamp 104 and also through contact 80, contact 33 and wire 105 to left rear lamp 93. Current flowing in wire 96 causes it to expand to permit blade 95 to bias downwardly to move its contact 99 into engagement with contact 98, thereby short-circuiting resistor 97 and hot wire 96. The temperature of wire 96 decreases and it contracts to pull contact 99 away from contact 98, thereby interrupting the short-circuit of wires 96 and 97 whereupon current again flows to heat wire 96 and contact 99 returns into engagement with contact 98. This cycle is repeated so long as contact 80 remains in the position shown. Therefore the lamps 104 and 93 burn intermittently to indicate by a flashing signal a left turn. At the same time a hinged armature blade 106 is attracted to move its contact 107 into engagement with a contact 108. This connects the battery with left turn pilot lamp 109 and right turn pilot lamp 110. Lamp 109 burns because its circuit is completed through right front lamp 111 which does not burn perceptibly because the voltage drop through it is insufficient. If the brakes are applied, switch 90 is closed and lamp 92 burns steadily to indicate a stop, while lamp 93 burns intermittently to indicate a turn.

Figure 3:
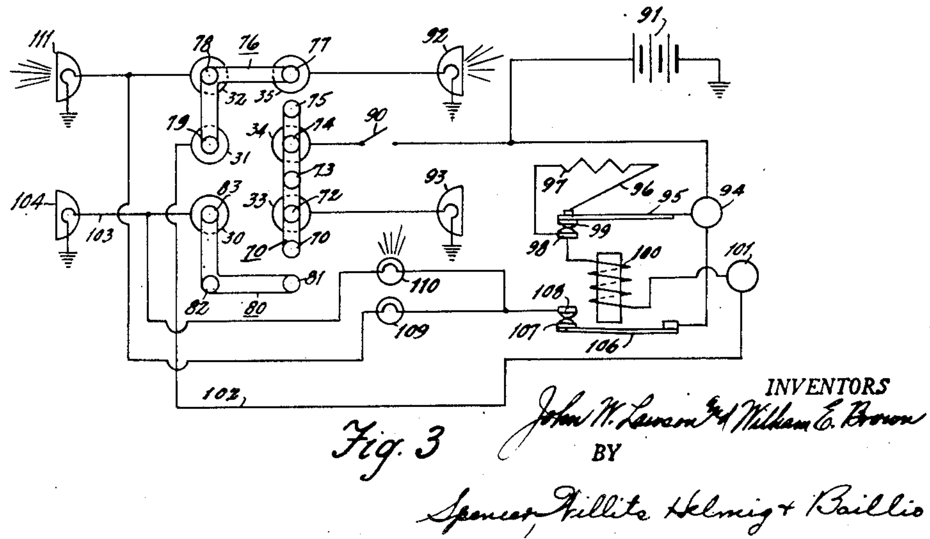

Fig. 3 shows the positions of the switch contacts 70, 76 and 80 when handle 46 has been moved down (Fig. 10) to indicate a right turn. Since contact 76 connects contacts 31, 32 and 35, right front signal lamp 111 and right rear signal lamp 92 burn intermittently through the operation of the flasher in the manner described with reference to Fig. 2. Blade 106 moves up as before to connect contacts 107 and 108 and pilot lamp 110 indicates that the flasher is operating the right turn signals, the circuit of lamp 110 being completed through lamp 104 which does not burn perceptibly. Pilot lamp 109 does not burn since it is short-circuited by the circuit through magnet coil 100 and wire 102. When brakes are applied stop light switch 90 is closed and left rear lamp 93 burns steadily to indicate the application of brakes while lamp 92 is flashing to indicate a right turn.

From the foregoing it is apparent that the system provides for the indication of turns by the flashing of the proper front and rear lamps, for the steady burning of the non-flashing rear lamp when brakes are applied and for the indication by pilot lamps that the system is operating properly for left and right turns. If, when the system is set for indicating a left turn, pilot lamp 109 does not burn, this is an indication that the signal system is not operating properly; and, when right turn pilot lamp 110 does not burn when the switch is set for right turn signal, this is an indication that the system is not operating properly.

Referring to Figs. 14, 15 and 16, it will be noted that the switch back plate 26 is provided with recess "*d*" adjoining the heads of contact members 33, 34 and 35. In the neutral position of the switch, bosses 71, 73 and 75 engage contacts 33, 34 and 35, respectively, and bosses 72 and 74 face into the recess "*d*" and do not touch anything. Since bosses 71, 73 and 75 are not on the same line, they make a tripod or three-point contact with contacts 33, 34 and 35. In other positions of contact 70 as shown in Figs. 15 and 16, a two-point contact is made with stationary contacts. The other movable contacts have three bosses each so that they will make a tripod or three-point contact respectively with contacts 31, 32, 35 and contacts 30, 31, 33. Although contact 70 has five bosses, not more than three of said bosses will engage a stationary part at the same time.

While the embodiment of the present invention as herein disclosed, constitutes a preferred form, it is to be understood that other forms might be adopted, all coming within the scope of the claims which follow.

What is claimed is as follows:

1. In a direction signalling system for vehicles including right front, left front, right rear and left rear indicating lamps, turn signal switching means, circuits connecting each of said lamps to said switching means, a source of current for said lamps, an electrically-operated automatic flasher switch having its intermittent contact actuating mechanism connected in series circuit between said source and said switching means for periodically interrupting the current flow to said switch, means provided in said switching means for selectively connecting the right front and right rear lamps or the left front and left rear lamps to said source through said flasher switch, a circuit interrupter actuated by the contact actuating mechanism of said flasher switch, said interrupter having its input terminal connected to said source, and a pair of pilot lamps connected in parallel circuits between the front lamps and the output terminal of said interrupter.

2. In a direction signalling system for vehicles including right front, left front, right rear and left rear indicating lamps, turn signal switching means, circuits connecting each of said lamps to said switching means, a source of current for said lamps, an electrically-operated automatic flasher switch having its intermittent contact actuating mechanism connected in series circuit between said source and said switching means for periodically interrupting the current flow to said switch, means provided in said switching means for selectively connecting the right front and right rear lamps or the left front and left rear lamps to said source through said flasher switch, a circuit interrupter actuated by the contact actuating mechanism of said flasher switch, and a pair of pilot lamps connected in parallel circuits between the output terminal of said interrupter and the circuits between the front lamps and said switching means.

3. In a direction signalling system for vehicles including right front, left front, right rear and left rear indicating lamps, turn signal switching means, circuits connecting each of said lamps to said switching means, a source of current for said lamps, an electrically-operated automatic flasher switch having its intermittent-contact actuating mechanism connected in a series circuit between said source and said switching means for periodically interrupting the current flow to said switch, means provided in said switching means for selectively connecting the right front and right rear lamps or the left front and left rear lamps to said source through said flasher switch, a circuit interrupter actuated by the contact actuating mechanism of said flasher switch, said interrupter having its input terminal connected to said source and its output terminal connected by parallel circuits to each of said front lamps and a pilot lamp connected in series in each of said parallel circuits.

4. In a direction signalling system for vehicles including right front, left front, right rear and left rear indicating lamps, turn signal switching means, circuits connecting each of said lamps to said switching means, a source of current for energizing said lamps, an electrically-operated automatic flasher switch having its intermittent contact actuating mechanism connected in series circuit between said source and said switching means for periodically interrupting the current flow to said switch, means provided in said switching means for selectively connecting either the right front and right rear lamps or the left front and left rear lamps to said source through said flasher switch, a circuit interrupter actuated by the contact actuating mechanism of said flasher switch having its input terminal connected to said source and its output terminal connected to the terminals of a pair of pilot lamps, parallel circuits connecting the other terminals of the pilot lamps to the respective front lamps, one or the other of said pilot lamps being energized through the non-signaling front lamp circuit when the other front and corresponding rear lamp circuits are connected to said source for intermittent energization through said flasher switch.

5. In a direction signalling system for vehicles including a right front lamp, a right rear lamp, a left front lamp, a left rear lamp and a pair of pilot lamps, turn signal switching means, circuits connecting each of said front and rear lamps to said switching means, a source of current for energizing said lamps, an electrically operated flasher switch having its intermittent contact actuating mechanism connected in series circuit between said source and said switching means for periodically interrupting the current flow to said switch, means provided in said switching means for selectively connecting either the right front and right rear lamps or the left front and left rear lamps to said source through said flasher switch, a circuit interrupter actuated by the contact actuating mechanism of said flasher switch having its input terminal connected to said source and its output terminal connected to the terminals of said pilot lamps, parallel circuits connecting the other terminals of said pilot lamps respectively to each of said front lamps for intermittent energization of one or the other of said pilot lamps through its circuit to the front lamp disconnected by said switching means from energization from said source through said flasher switch when the other front lamp and corresponding rear lamp circuits are connected by said switching means to said source for intermittent energization through said flasher switch.

6. In a direction signaling system for vehicles including left and right front signaling lamps, direction signal switching means, circuits connecting each of said lamps to said switching means, a source of current for said lamps, an electrically operated automatic flasher switch having its intermittent contact actuating mechanism connected in series circuit between said source and said switching means for periodically interrupting the current flow to said switching means, means provided in said switching means for selectively connecting said signaling lamps to said source through said flasher switch, a circuit interrupter actuated by the contact actuating mechanism of said flasher switch, said interrupter having its input terminal connected to said source and a pair of pilot lamps connected in parallel circuits between said signaling lamps and the output terminal of said interrupter.

7. In a direction signaling system for vehicles including left and right signaling lamps, direction signal switching means, circuits connecting each of said lamps to said switching means, a source of current for said lamps, an electrically operated automatic flasher switch having its intermittent contact actuating mechanism connected in series circuit between said source and said switching means for periodically interrupting the current flow to said switching means, means provided in said switching means for selectively connecting said signaling lamps to said source through said flasher switch, a circuit interrupter actuated by the contact actuating mechanism of said flasher switch, said interrupter having its input terminal connected to said source and a pair of pilot lamps connected in parallel circuits between said signaling lamps and the output terminal of said interrupter.

8. In a direction signaling system for vehicles including left and right rear signaling lamps, direction signal switching means, circuits connecting each of said lamps to said switching means, a source of current for said lamps, an electrically operated automatic flasher switch having its intermittent contact actuating mechanism connected in series circuit between said source and said switching means for periodically interrupting the current flow to said switching means, means provided in said switching means for selectively connecting said signaling lamps to said source through said flasher switch, a circuit interrupter actuated by the contact actuating mechanism of said flasher switch, said interrupter having its input terminal connected to said source and a pair of pilot lamps connected in parallel circuits between said signaling lamps and the output terminal of said interrupter.

9. In a direction signaling system for vehicles including left and right rear signaling lamps, direction signal switching means, circuits connecting each of said lamps to said switching means, a source of current for said lamps, an electrically operated automatic flasher switch having its intermittent contact actuating mechanism connected in series circuit between said source and said switching means for periodically interrupting the current flow to said switching means, means provided in said switching means for selectively connecting said signaling lamps to said source through said flasher switch, a circuit interrupter actuated by the contact actuating mechanism of said flasher switch, said interrupter having its input terminal connected to said source, a pair of pilot lamps connected in parallel circuits between said signaling lamps and the output terminal of said interrupter, and means including a brake operable switch in the circuit between said source of current and said direction signal switching means for causing energization of both of said signaling lamps when neither is caused to be energized by said direction signal switching means, causing steady energization of the left signaling lamp when the right signaling lamp is caused to be energized by said direction signal switching means, and steady energization of said right signaling lamp when the left signaling lamp is caused to be energized by said direction signalling switching means.

JOHN W. LAWSON.
WILLIAM E. BROWN.

REFERENCES CITED

The following references are of record in the file of this patent:

UNITED STATES PATENTS

| Number | Name | Date |
|---|---|---|
| 1,697,586 | Batcheller | Jan. 1, 1929 |
| 2,036,676 | Bell | Apr. 7, 1936 |
| 2,125,668 | Chase | Aug. 2, 1938 |
| 2,172,068 | Murray | Sept. 5, 1939 |
| 2,300,896 | Hosmer | Nov. 2, 1942 |
| 2,304,963 | Smith | Dec. 15, 1942 |
| 2,486,599 | Hollins | Nov. 1, 1949 |